(12) United States Patent  (10) Patent No.: US 6,513,638 B2
Thyselius  (45) Date of Patent: Feb. 4, 2003

(54) VEHICLE LATCH ARRANGEMENT

(75) Inventor: Lars Thyselius, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/682,801

(22) Filed: Oct. 19, 2001

(65) Prior Publication Data

US 2002/0040839 A1 Apr. 11, 2002

Related U.S. Application Data

(63) Continuation of application No. PCT/SE00/00754, filed on Apr. 19, 2000.

(51) Int. Cl.$^7$ ................................................ B60K 41/26
(52) U.S. Cl. ............................................... 192/219.5
(58) Field of Search ......................... 192/219.5, 222, 192/221; 188/31, 69, 189; 74/411.5

(56) References Cited

U.S. PATENT DOCUMENTS

| | | | | |
|---|---|---|---|---|
| 2,350,014 A | * | 5/1944 | Burt ........................... 188/189 |
| 2,966,244 A | * | 12/1960 | Schreyer ....................... 188/31 |
| 3,610,004 A | * | 10/1971 | Neese ........................ 292/144 |
| 3,937,105 A | | 2/1976 | Arai et al. |
| 4,509,624 A | | 4/1985 | Barr |
| 4,966,262 A | * | 10/1990 | Mieczkowski ............... 192/222 |
| 5,505,674 A | * | 4/1996 | Furukawa et al. .......... 475/128 |
| 5,696,679 A | * | 12/1997 | Marshall et al. ............ 192/222 |
| 5,704,457 A | | 1/1998 | Kimura et al. |
| 5,827,149 A | * | 10/1998 | Sponable .................... 74/411.5 |
| 6,044,724 A | * | 4/2000 | Timms ........................ 74/411.5 |
| 6,095,310 A | * | 8/2000 | Voda et al. .............. 192/220.4 |
| 6,124,789 A | * | 9/2000 | Barr ........................... 340/438 |
| 6,199,442 B1 | * | 3/2001 | Bauer et al. .................. 188/31 |
| 6,250,433 B1 | * | 6/2001 | Sealine et al. ................ 188/31 |

FOREIGN PATENT DOCUMENTS

DE  19643303 A1  4/1998

* cited by examiner

*Primary Examiner*—Rodney H Bonck
(74) *Attorney, Agent, or Firm*—Howrey Simon Arnold & White LLP

(57) ABSTRACT

The invention relates to a latch arrangement for a vehicle. The latch arrangement includes a latch element which cooperates with a gear wheel that is rotatable in a gear box. When the latch element is inserted between two teeth of the gear wheel, the vehicle is prevented from moving. The gear box includes a control unit connected to a gear lever. The control unit controls the gear box in relation to the setting of the gear lever. The control unit is able to guide the latch element to the position inserted between the teeth should the connection between the control unit and the gear lever become interrupted.

12 Claims, 1 Drawing Sheet

VEHICLE LATCH ARRANGEMENT

CROSS REFERENCE TO RELATED APPLICATIONS

The present application is a continuation of International Application No.

PCT/SE00/00754, filed Apr. 19, 2000, which claims priority to Swedish Application No. 9901402-9, filed Apr. 20, 1999.

BACKGROUND OF INVENTION

Technical Field.

The present invention relates to a vehicle latch arrangement. More specifically, the present invention relates to a latch element able to cooperate with a gear wheel that is rotatable in a gear box, so that when the latch element is inserted between two teeth of the gear wheel, the vehicle is prevented from moving.

Background Information.

Latch arrangements of the above type are used to prevent a vehicle from moving when a vehicle is parked. In vehicles having automatic gear boxes, a latch arrangement is activated when the gear lever is shifted into the park position, e.g., the latched position. The latch arrangement includes a latch element which engages with a gear wheel in the gear box when the gear lever is shifted into the park position and disengages with the gear wheel when the gear lever is shifted out of the park position. The gear wheel is coupled to the drive shaft of the vehicle and, in the latched position, the gear wheel and thus the drive shaft are prevented from rotating. To ensure that the driver does not forget to move the gear lever to the park position when the driver wishes to leave the vehicle, a wire is coupled from the gear lever to a latch on the ignition lock, with the latch preventing the ignition key from being removed from the ignition lock while the gear lever is not in the park position. Thus, the driver has to first move the gear lever to the park position before the ignition key can be taken out of the ignition lock.

If the connection between the gear lever and the gear box is interrupted, the latch arrangement is not activated when the gear lever is moved to the park position, thus the vehicle is able to move despite the fact that the gear lever is in the park position. In particular if the connection between the gear lever and the gear box is electrical or hydraulic, it is difficult for the driver to tell whether this connection is interrupted. It is also difficult to tell whether the connection between the gear lever and the gear box is interrupted while driving for vehicles having an automatic gear box.

SUMMARY OF INVENTION

The object of the present invention is to make available a latch arrangement for a vehicle that prevents the vehicle from moving if a fault occurs in the connection between the gear lever and the gear box. This is accomplished by of a latch arrangement similar to the type described above, but wherein the gear box includes a control unit connectable to a gear lever. The control unit is able to control the gear box based on the set position of the gear lever. The control unit is further able to guide the latch element to the position inserted between the teeth if the connection between the control unit and the gear lever is interrupted.

Such a latch arrangement ensures that a parked vehicle does not start moving, regardless whether the connection between the gear lever and the control unit is interrupted. When the driver has stopped or parked the vehicle, the latch element engages between the teeth of the gear wheel. When the control unit detects an interrupted connection between the gear lever and the control unit, the latch element engages between the teeth of the gear wheel the next time the vehicle is stopped. In doing so, the latch arrangement of the present invention thereby eliminates the risk of the vehicle moving when it is parked. At the same time, the vehicle cannot be driven if the connection between the gear lever and the control unit is interrupted.

BRIEF DESCRIPTION OF DRAWINGS

The invention will be explained in more detail below with reference to illustrated embodiments represented in the attached drawings, in which.

DETAILED DESCRIPTION

Figure 1:
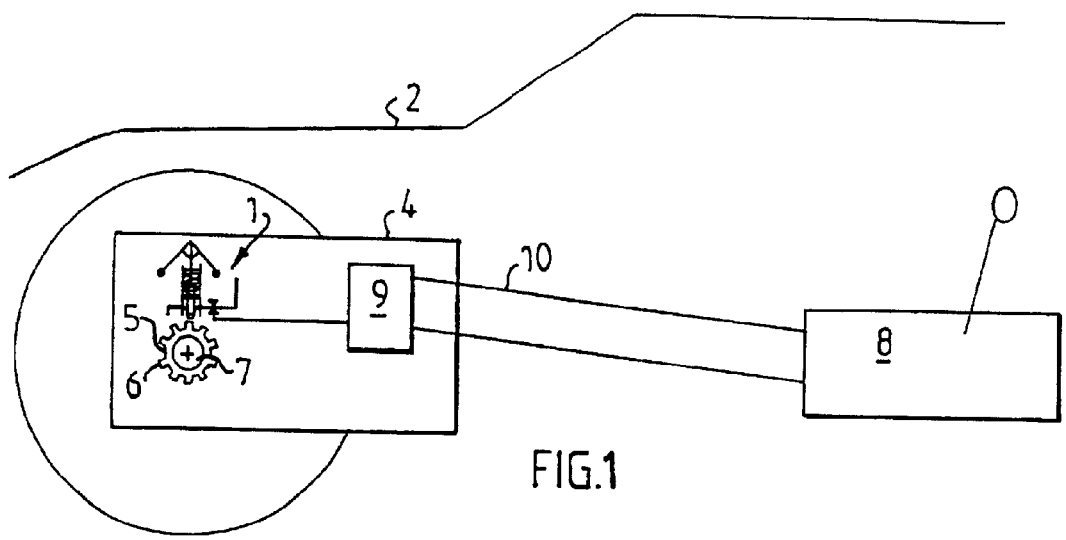
FIG. 1 illustrates a diagrammatic view of a latch arrangement according to the present invention arranged in a gear box.

An embodiment of a latch arrangement 1 for a vehicle 2 according to the present invention is shown in FIG. 1. The latch arrangement 1 comprises a latch element 3 that cooperates with a gear wheel 5 that can rotate in a gear box 4. When the latch element 3 is inserted between two teeth 6 of the gear wheel 5, the vehicle 2 is prevented from moving. The gear wheel 5 is connected to a drive shaft 7 of the vehicle 2, so that the drive shaft 7 is prevented from rotating when the latch element 3 is inserted between the teeth 6 of the gear wheel 5. Alternatively, the gear wheel 5 can be coupled directly or indirectly to another gear wheel (not shown) which is connected to the drive shaft 7 of the vehicle 2. The latch arrangement can be used with an automatic or manual gear box 4.

A control unit 9 in the gear box 4 controls the gear box 4 and is connected to a gear lever 8. The connection between the control unit 9 of the gear box 4 and the gear lever 8 can be one or more electrical or hydraulic lines 10. In an alternate embodiment, the connection is mechanical. When the gear lever 8 is set in a certain position, e.g., a selected gear, the control unit controls the gear box 4 accordingly. For example, if the gear lever 8 is set in the reverse position, i.e., the vehicle 2 is to be reversed, the control unit 9 controls the gear wheels 15 in the gear box 4 to enable the vehicle 2 to be driven in reverse, e.g., backwards.

The control unit 9 is also adapted to guide the latch element 3 to the position inserted between the teeth 6 when the gear lever 8 is set in the park position and/or when an ignition member (not shown), such as an ignition key, is in a position other than the ignition position. When the ignition key is turned from the ignition position, e.g., when the engine is to be shut off, the latch element 3 is guided to the position inserted between the teeth 6. The control unit 9 can be arranged to control just the latch element 3. In such an embodiment, the gear lever 8 can be mechanically coupled to the gear box 4 in a conventional manner. The control unit 9 then receives signals from a sensor (not shown) on the gear lever 8 indicating whether the gear lever 8 is in the park position.

If the connection between the gear lever 8 and the control unit 9 of the gear box 4 is interrupted, for example if an electrical line 10 between 30 the gear lever 8 and the control unit 9 is severed, the control unit 9 detects the interruption and activates the latch arrangement 1. Activating the latch arrangement 1 causes the latch element 3 to engage between the teeth 6 of the gear wheel 5 once the vehicle 2 stops.

Figure 2:
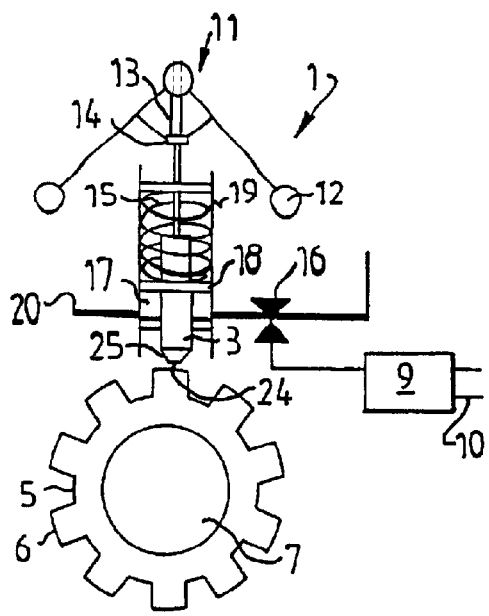
FIG. 2 illustrates a diagrammatic view of one embodiment of a latch arrangement according to the present invention.

FIG. 2 illustrates a diagrammatic view of a first embodiment of a latch arrangement 1 according to the present invention. The latch arrangement 1 comprises a latch element 3 that can be guided between two teeth 6 of a gear wheel 5, thus preventing the gear wheel 5 from rotating. A sensor in the latch arrangement 1 detects the speed of the vehicle 2 and prevents the latch arrangement 1 from engaging with the gear wheel 5 if the vehicle 2 exceeds a predetermined speed. As illustrated in FIG. 1, the sensor consists of a mechanical centrifugal regulator 11 arranged on the latch element 3.

Preventing the latch element 3 from being driven in the direction towards the gear wheel 5 when the speed of the vehicle 2 is above a predetermined speed, damage to the gear wheel 5 and latch element 3 is avoided. The centrifugal regulator 11 comprises rotating bodies 12 which are driven by the vehicle 2 and which are flung, by centrifugal force, in the direction away from a shaft 13 to which the bodies 12 are articulated connected. The bodies 12 are also connected to the latch element 3 via a displaceable element 14, so that the displaceable element 14 draws the latch element 3 in a direction away from the gear wheel 5 when the bodies 12 are flung, by the centrifugal force, outwards in the direction away from the shaft 13.

The latch arrangement 1 is provided with a spring member 15 in the form of a helical spring which acts with a force on the latch element 3 in a direction towards the gear wheel 5. A retainer which is acting on by the control unit 9 is arranged to overcome the force from the spring member 15. As illustrated in FIG. 2, the retainer consists of a hydraulic valve 16 which, upon actuation by the control unit 9, ensures that the latch element 3 can be freely displaced in the direction towards the gear wheel 5. By opening the hydraulic valve 1 6, hydraulic fluid is supplied to a space 17 formed in the latch arrangement 1. The hydraulic fluid, when under sufficient pressure, overcomes the force from the spring member 15 and prevents the latch element 3 from being displaced in the direction towards the gear wheel 5. The space in the latch arrangement 1 is formed by a flange 18 arranged on the latch element 3 and a cylinder 19 arranged around the latch element 3. The latch element 3 and its flange 18 thus function as a displaceable piston in the cylinder 19. The cylinder 19 is provided with an opening 20 through which hydraulic fluid can continuously leave the space 17. By closing the hydraulic valve 16, the hydraulic fluid is pressed out of the space 17 through the opening 20 under the action of the spring member 15. The latch element 3 is thus displaced in the direction towards the gear wheel 5 and prevents the gear wheel 5 from rotating.

Figure 3:
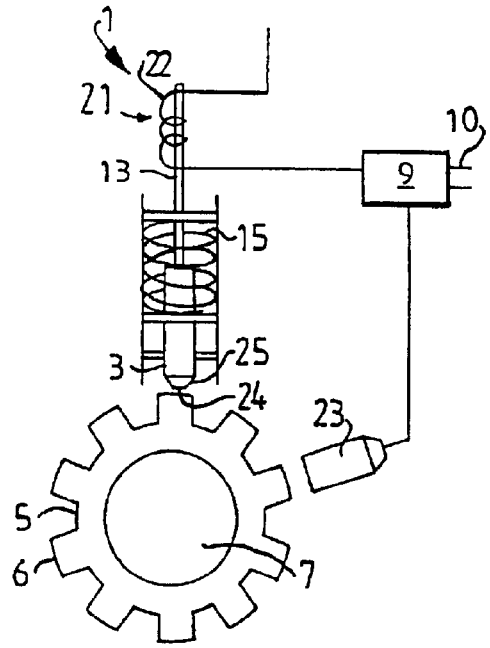
FIG. 3 illustrates a diagrammatic view of another embodiment of a latch arrangement according to the present invention.

FIG. 3 illustrates another illustrative embodiment of a latch arrangement 1 according to the invention. The retainer comprises an electromagnetic power device 21 which, upon actuation by the control unit 9, ensures that the latch element 3 is prevented from being moved in the direction towards the gear wheel 5. The electromagnetic power device 21 comprises a spool 22 to which current is supplied with the aid of the control unit 9. The shaft 13 on the latch element 3 is made of a magnetic material, such as steel, and extends through the spool 22. When electrical current is connected to the spool 22, the shaft 13 is retained by the spool 22, as shown in FIG. 3. As illustrated, the speed-detecting sensor consists of a detector 23 on the vehicle for detecting the rotation of the gear wheel 5.

The detector 23 can also be arranged to detect the rotation of a second component rotating on the vehicle 2, which is proportional to the speed of the vehicle 2. When the gear wheel 5 rotates, the detector 23 emits signals to the control unit 9 which causes the relay 21 to retain the shaft 13 so that the latch element 3 cannot be moved in the direction towards the gear wheel 5. As a result, damage to the latch element 3 and gear wheel 5 is prevented. One end 24 of the latch element 3 directed towards the gear wheel 5 is preferably provided with a bevel 25 so that the latch element 3 will rebound on the teeth 6 of the gear wheel 5 if the force acting against the spring member 15 disappears when the gear wheel rotates. The bevel 25 also facilitates insertion of the latch element between the teeth 6.

The latch arrangement 1 can also be provided with a free coupling (not shown) which can be acted on manually. With the free coupling, the latch element 3 is released from the gear wheel 5, so that the vehicle can move despite the latch arrangement 1 having been activated. The free coupling means that the vehicle 2 can be towed when the latch 10 arrangement 1 has been activated.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A latch arrangement for a vehicle, the latch arrangement comprising:
    a gear wheel rotatable in a gear box,
    a latch element adapted to cooperate with the gear wheel so that when the latch element is inserted between two teeth of the gear wheel, the vehicle is prevented from moving, and
    a control unit connected to a gear lever for controlling the gear box in relation to a set position of the gear lever,
    wherein the control unit guides the latch element to a position between the teeth of the gear wheel if the connection between the control unit and the gear lever is interrupted.

2. The latch arrangement according to claim 1, wherein the latch element further comprises a spring member which pretensions the latch element in a direction towards the gear wheel, and the latch arrangement further comprises a retainer able to be acted on by the control unit and arranged to overcome the force from the spring member.

3. The latch arrangement according to claim 2, wherein the retainer further comprises a hydraulic valve actuated by the control unit for ensuring that the latch element can be freely displaced in the direction towards the gear wheel.

4. The latch arrangement according to claim 2, wherein the retainer further comprises an electromagnetic power device actuated by the control unit for ensuring that the latch element is prevented from being displaced in the direction towards the gear wheel.

5. The latch arrangement according to claim 1, further comprising a sensor arranged to detect the speed of the vehicle, wherein the latch element is prevented from engaging with the gear wheel if the vehicle exceeds a predetermined speed.

6. The latch arrangement according to claim 5, wherein the sensor further comprises a detector for detecting the rotation of the gear wheel, the detector being connectable to the control unit.

7. The latch arrangement according to claim 5, wherein the sensor further comprises a mechanical centrifugal regulator coupled to the latch element.

8. The latch arrangement according to claim 1, wherein the connection between the gear lever and the control unit comprises electrical lines.

9. The latch arrangement according to claim 1, wherein the connection between the gear lever and the control unit comprises hydraulic lines.

10. The latch arrangement according to claim 1, wherein the gear box is an automatic gear box.

11. The latch arrangement according to claim 1, wherein the gear box is a manual gear box.

12. The latch arrangement according to claim 1, wherein the connection between the control unit and the gear lever is a signal indicative of the gear lever position, and wherein the control unit guides the latch element to a position between the teeth of the gear wheel should said signal be interrupted.

* * * * *